(12) United States Patent
Vollebregt (10) Patent No.: US 7,366,764 B1
(45) Date of Patent: Apr. 29, 2008

(54) METHOD FOR THE IDENTIFICATION AND MANAGEMENT OF MASS UNSOLICITED E-MAIL

(75) Inventor: Bram J. Vollebregt, Almere (NL)

(73) Assignee: Chelonia LLC, Minneapolis, MN (US)

( * ) Notice: Subject to any disclaimer, the term of this patent is extended or adjusted under 35 U.S.C. 154(b) by 839 days.

(21) Appl. No.: 10/875,885

(22) Filed: Jun. 23, 2004

(51) Int. Cl.
*G06F 15/16* (2006.01)
*H04N 7/167* (2006.01)
*G06F 11/00* (2006.01)
*H04L 9/00* (2006.01)
*H04L 12/58* (2006.01)

(52) U.S. Cl. .................. 709/207; 709/206; 709/205; 380/201; 726/22; 726/23; 726/24; 726/25; 713/176; 455/412

(58) Field of Classification Search ................ 709/206, 709/205, 207; 380/201; 726/22, 23, 24, 726/25; 713/176; 455/412
See application file for complete search history.

*Primary Examiner*—Nathan Flynn
*Assistant Examiner*—Ashley D Turner
(74) *Attorney, Agent, or Firm*—Rodney Dickason Sloan Akin & Robb, P.A.; DeWitt M. Morgan (57) ABSTRACT

The present invention is a system and method for the identification and management of mass unsolicited e-mail, commonly known by the term "SPAM." The system and method function by assembling a group of users, identifying portions of all of the e-mail sent to those users, and then counting, among all of the users, the number of instances of receipt of identical pieces of e-mail. If the number of instances attains a certain value, it can be identified as Spam and managed according to user preferences.

16 Claims, 7 Drawing Sheets

METHOD FOR THE IDENTIFICATION AND MANAGEMENT OF MASS UNSOLICITED E-MAIL

FIELD OF THE INVENTION

The present invention is related generally to the field of Internet based communications. More specifically, the system of the present invention relates to an automated method of determining whether an electronic communication is a mass, unsolicited e-mail, commonly known by the term "SPAM." Even more specifically, the present invention relates to a system of developing hash codes, each hash code being generated from the content of e-mail. These hash codes can then be counted among a given population of e-mail recipients to determine whether an e-mail is mass unsolicited e-mail.

BACKGROUND OF THE INVENTION

Electronic mail, commonly known as e-mail, has become a very popular method of communicating. The ease and efficiency by which e-mail can be sent and received while still providing for a written document has revolutionized the method of communicating, as well as had an enormous impact on how society interacts socially. The pervasiveness of e-mail communications has also engendered the development of businesses whose sole function is to provide the infrastructure necessary to facilitate the billions of e-mail generated daily.

The sheer numbers of computer users, coupled with the fact that nearly every computer user has at least one, and regularly many, e-mail addresses, has also created a fertile source of advertising. Many business entities have developed ways to send e-mail to literally millions of e-mail addresses substantially simultaneously. These e-mails are typically unsolicited by the owners of the e-mail addresses to whom they are sent and are almost universally regarded as nuisances to not only the recipients of the messages, but also to the Internet service providers (ISP)s who must provide the storage capacity and transmission bandwidth to facilitate these voluminous communications. Moreover, recipients of these e-mails must expend valuable time downloading these messages only to subsequently delete them so as not to waste local machine or network resources. This time can be significant as many alternate methods of receiving e-mail, such as through telephones lines and personal digital assistants (PDA)s, have very limited memory and processing capabilities.

The negative effects of unsolicited mass e-mail are summarized below. First, unsolicited mass e-mail requires a large amount of bandwidth to be allocated to the delivery, which ultimately slows down the delivery of desired content, whether that content be web pages or legitimate e-mails. Second, these mass e-mailing techniques can often contain inappropriate content for some viewers. Finally, it is not unusual for e-mail based computer viruses to be attached to these mass e-mails, causing devastating effects to computer terminals and networks. Thus, it is highly desirable to be able to identify and delete these mass unsolicited e-mails before they are delivered to a user's computer.

There have been multiple attempts to address this problem in the past, some of which have been marginally successful in combating SPAM types of e-mail. First, some unsolicited e-mails are consistently sent by known entities. The names of these entities are placed onto a blacklist and any e-mail which is sent by these entities can be automatically deleted from a post office server, thus never reaching the e-mail client. Second, some unsolicited mass e-mails are identifiable by the content of the message. For example, if the sender of the e-mail is different from the sender field in the header of the e-mail message, it can be identified as spam and accordingly deleted from the post office server. Finally, weighted key phrases within the text of e-mail messages can be identified, (for example, those having adult oriented words or advertising lingo) and those messages containing these phrases can be identified as spam and deleted from the post office server. All of these methods serve to prohibit some e-mail messages from being delivered to an e-mail client, however, all of these methods have some discrepancies as those entities sending unsolicited mass e-mails are constantly devising new methods of overcoming the identification mechanisms.

With regard to the blacklisting method of e-mail blocking, only those e-mails being generated from a known source can be blocked. This method is easily overcome by simply changing the name of the sender, or establishing new domain name servers to generate these messages. Furthermore, this method does nothing to protect e-mail recipients from the countless spam generators who may not have been identified. The other two methods of spam blocking, i.e. recognizing certain attributes within an e-mail that signal that it is spam, or red flagging certain keywords within the text of e-mails, are easily overcome by simply generating e-mails that avoid these identification techniques.

Therefore, what is needed is a method and apparatus for the real time identification and removal of unsolicited mass e-mails which cannot be overcome by the simple aversion techniques.

OBJECTS OF THE INVENTION

It is one object of the present invention to provide for a system that can both identify and prohibit unsolicited mass e-mail from being delivered to an e-mail client.

It is another object of the present invention to provide for a system that can identify unsolicited mass e-mail without relying on prior identification of that e-mail as being unsolicited mass e-mail.

It is yet another object of the present invention to provide for a system that can identify unsolicited mass e-mail without relying on the recognition of certain key words within the text of such e-mail.

It is still yet another object of the present invention to provide for a system which counts the number of identical e-mails sent to a population of e-mail addresses by comparing at least portions of those e-mails, and identifies certain of those e-mails as mass, unsolicited depending on the number of instances of identity.

It is still yet another object of the present invention to provide for a system of managing e-mails identified as mass unsolicited e-mails based on the preferences of the owner of the e-mail address to which that mass unsolicited e-mail was sent.

It is still yet another object of the present invention to provide for a system which can identify and safely manage e-mails containing viruses.

SUMMARY OF THE INVENTION

In its broadest embodiment, the system of the present invention provides for a method of comparing e-mails sent to a population of recipients and counting the number of identical e-mails, each recipient having at least one e-mail address. The computer application of the present invention combines known programming routines and sub-routines in such a way as to uniquely and efficiently identify unsolicited mass e-mail. Each user will give the application of the present invention authorization to access his or her e-mails accounts. Once a sufficient population of e-mail recipients has been assembled (preferably at least thousands), and all of the recipients have given the system authorization to access the appropriate e-mail mailbox, the system can then uniquely identify the content of at least portions of all of the e-mails sent to the population of recipients and convert these portions into hashcodes. Because the hashcodes will be generated using the same protocols for each e-mail for each member of the population, all e-mails which contain identical content will be represented by identical hash codes. The system of the present invention then counts the number of members of the population to which that particular e-mail has been sent. When the number of instances attains a pre-defined number, the e-mail can be assumed to be mass unsolicited e-mail. Once identified as such, the application can manage the e-mails in any number of different methods, including deleting the e-mail before it is delivered to the e-mail client, transferring the e-mail to folder designated for storing said mass unsolicited e-mail, communicating at least portions of the e-mail to the intended recipient member of the population for that member to either accept or delete the e-mail, or any other commonly known protocol for the management of e-mail.

BRIEF DESCRIPTION OF THE DRAWINGS

A complete understanding of the present invention may be obtained by reference to the accompanying drawings, when considered in conjunction with the foregoing detailed description, in which.

For purposes of clarity and brevity, like elements and components will bear the same designations and numbering throughout the figures.

DESCRIPTION OF THE PREFERRED EMBODIMENT

Figure 1:
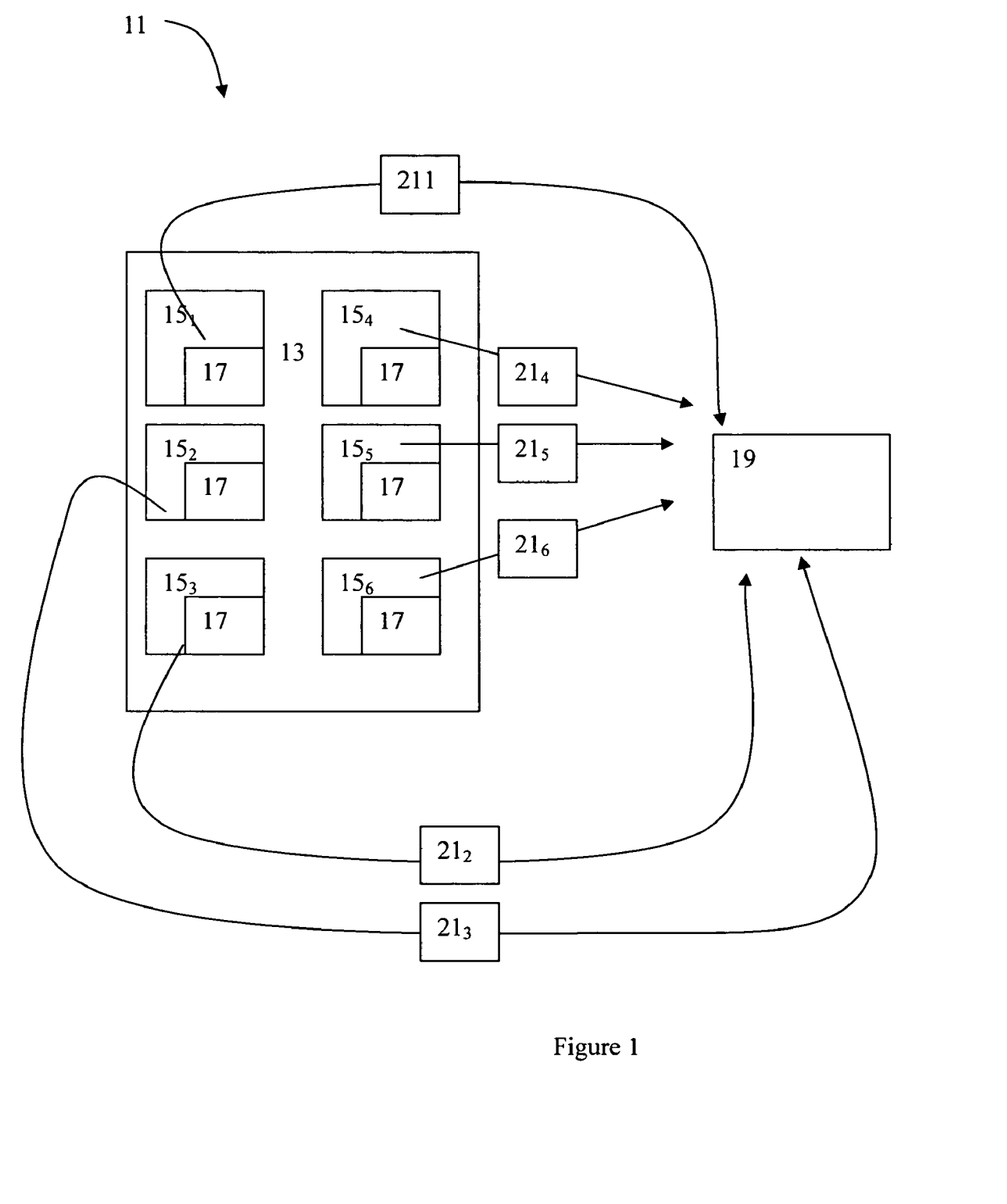
FIG. 1 illustrates the authorization procedure of the present invention.

The basic elements of the system 11 of the present invention, as illustrated in FIG. 1, are a population 13 of e-mail recipients 15 each having the attribute of having at least one e-mail address 17. Every e-mail address 17 for each e-mail recipient 15 is unique as to every other e-mail address.

The first step for the functioning of the present invention is the compiling of this population 13 comprised of e-mail recipients 15. Population 13 must contain an adequate number of e-mail recipients 15, for instance, at least hundreds and preferably at least thousands of e-mail recipients 15, in order for the system to function. However, it is envisioned that population 13 will, typically, be comprised of hundreds of thousands of e-mail recipients 15. E-mail recipients 15 all share two common attributes. First, e-mail recipients 15 all have at least one e-mail address 17 (each e-mail address 17 being unique to each recipient 15). Second, each e-mail recipients 15 must provide to an application 19 an authorization 21 to access all of the e-mail which is addressed to such recipient's at least one e-mail address 17. This authorization 21 normally takes the form of a password, but could be any authorization utilized by e-mail servers to authenticate the identity of each of e-mail recipients 15. It is through this second common attribute that population 13 is actually compiled.

Application 19, once properly authorized by each e-mail recipient 15 within population 13, will passively identify and manage all mass unsolicited e-mail sent to e-mail recipients 15. It is described as a passive process because once e-mail recipients 15 have provided authorization 21 to application 19 to access all of the e-mail addressed to e-mail address(es) 17, no further action is required by e-mail recipients 15. The process of identification of mass unsolicited e-mail by application 19 is described and illustrated with respect to FIG. 3.

Figure 2:
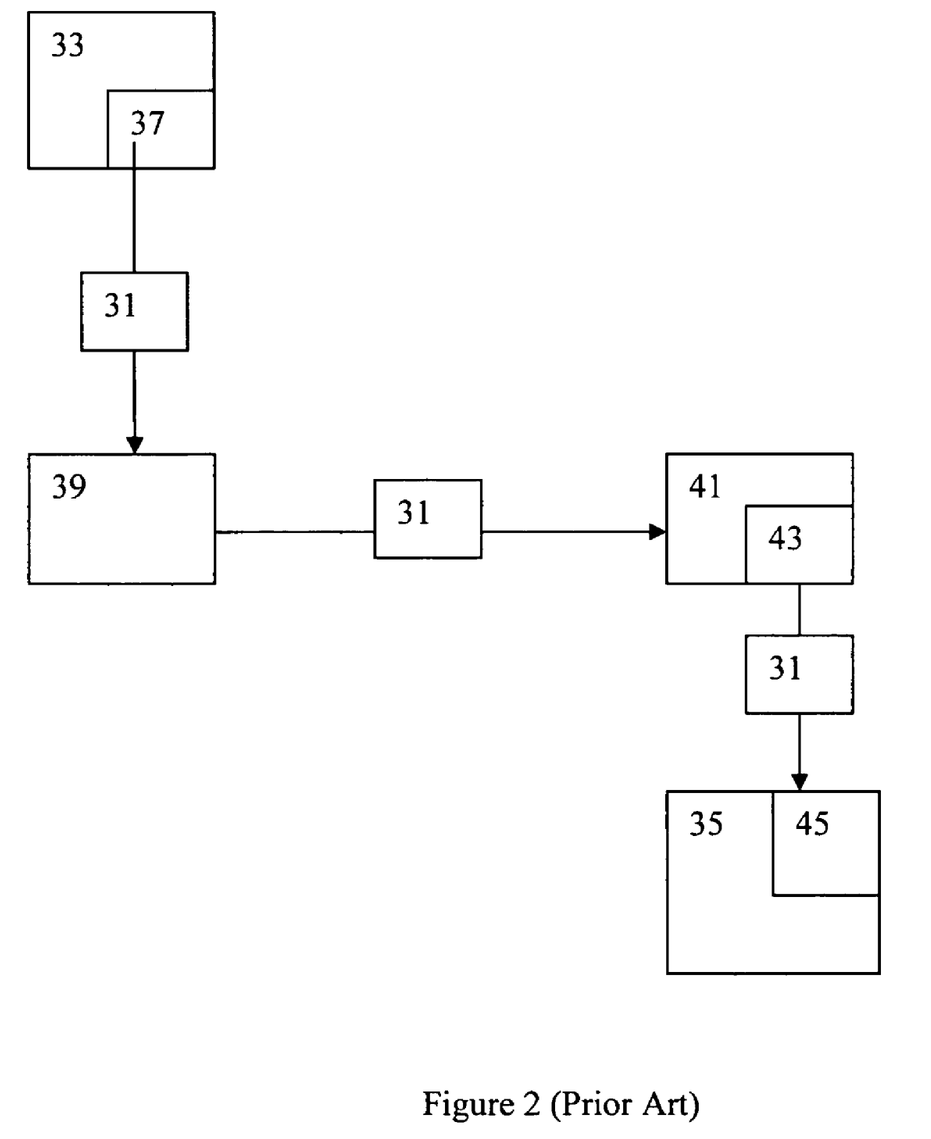
FIG. 2 illustrates a basic overview of the processes inherent to e-mail communication.

An understanding of the prior art, which is very briefly described with reference to FIG. 2, is necessary for an understanding of the present invention. E-mail 31 is generated by sender 33 to be delivered to recipient 35. First sender 33 generates e-mail 31 through e-mail generator 37. E-mail generator means 37 can be any device capable of sending an e-mail message. E-mail 31 is then sent to recipient 15 using outgoing mail server 39. Through processes known in the art, communication between outgoing e-mail server 39 and incoming mail server 41 takes place allowing incoming mail server 41 to deliver e-mail 31 to the appropriate mailbox 43 corresponding to e-mail address of the recipient 35. E-mail 31 is then temporarily stored in mailbox 43 in incoming mail server 41. Under normal circumstances, e-mail 31 will remain in mailbox 43 until recipient 35 accesses incoming mail server 41 (accomplished by, for example, recipient providing a password and username for the e-mail address associated with mailbox 43). While this procedure can take many various forms and complexities, as is known to those skilled in the art, the important aspect of this process for the purposes of the present invention is that e-mail 31 is stored in incoming mail server 41 until that e-mail is retrieved by recipient 35. It is before this last functional step that application 19 will intrusively intercept and analyze e-mail 31 in order to determine whether that e-mail is an unsolicited mass e-mail.

Figure 3:
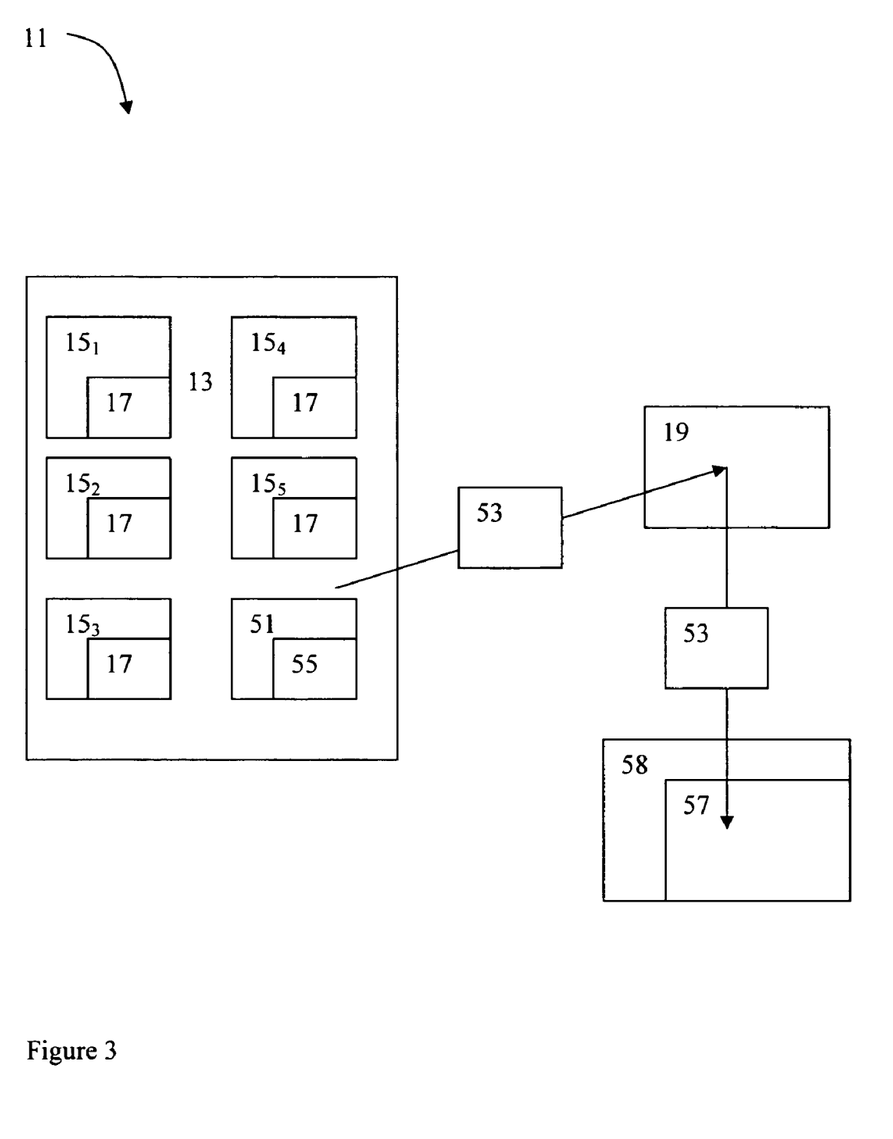
FIG. 3 illustrates the system of the present invention after the application of the present invention has provided proper authorization to the e-mail mailbox.

For the purpose of understanding the present invention with reference to FIG. 3, system 11 will be described with reference to not only population 13 of e-mail recipients 15, but also with respect to an individual e-mail recipient 51, who is a member of population 13. Once e-mail recipient 51 has provided application 19 with the authorization 53 to access the e-mail associated with the e-mail address(es) 55 of individual e-mail recipient 51, application 19 can then attempt to access the all e-mail which is addressed to e-mail address(es) 55. The procedure is accomplished by application 19 checking mailbox 57 (which is analogous to mailbox 43 of FIG. 2) within incoming mail server 58 to determine if the authentication properties communicated to application 19 during authorization 53 are acceptable by mailbox 57. This procedure is the same as if a human user were providing a password to that user's e-mail account and is thus a procedure well known in the art, only that, in the present invention, it is conducted by application 19 without any human involvement. In attempting to provide authorization 53 to mailbox 57, application 19 will attempt at least several protocols including but not limited to POP3, IMAP and HTTPmail, and can be updated to include additional protocols. The use of these different protocols are necessary due to the different protocols which the different e-mail mailboxes understand. Once a connection is established between application 19 and mailbox 57, application 19 will store the appropriate settings for access to and protocols for future communication with mailbox 57.

Figure 4A:
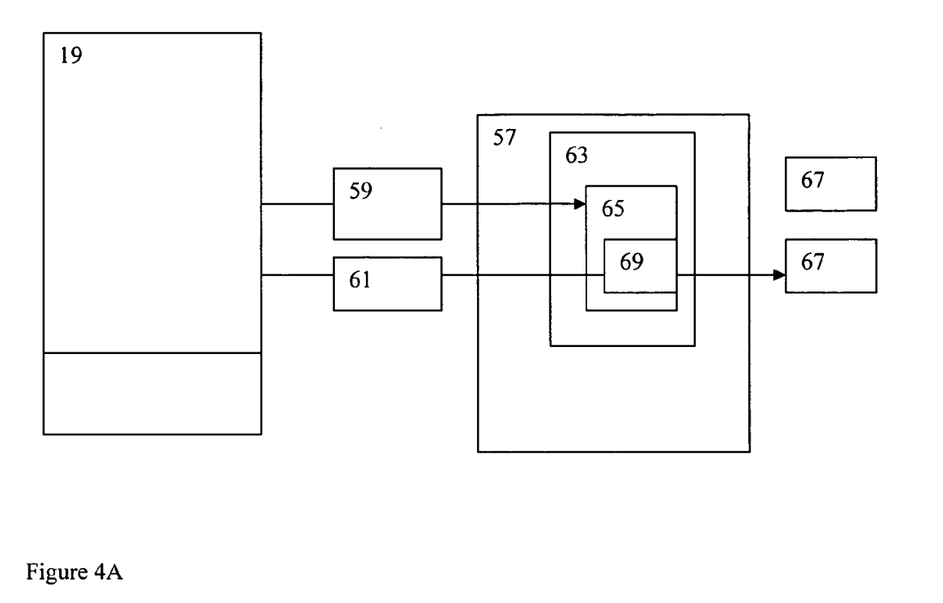
FIG. 4A illustrates the procedure for the generation of unique hash codes based on the content of a new e-mail message.

FIG. 4A illustrates system 11 after application has been successfully authorized to access e-mail messages by mailbox 57. Application 19 must analyze mailbox 57 to confirm whether or not mailbox 57 is capable of receiving and conducting a query request. As all modern e-mail mailboxes are equipped with such functionality, this is not considered to be a limitation on the present invention.

Application 19 will subsequently issue query 59 to mailbox 57 for all new e-mails 63 that have not yet been delivered to e-mail recipient 51, that is, those that remain stored in mailbox 57 and have never been accessed. This process will be described with reference to a single new e-mail 65 for the purposes of clarity. Application 19, using one way encryption algorithm 61, will create a hashcode 67 based upon at least parts of new e-mail 65. In the preferred embodiment, the parts of the new e-mail 65 that will be used will be contained within the header 69 of e-mail 65. However, alternate embodiments utilizing different parts of e-mail 65 can be utilized.

Figure 4B:
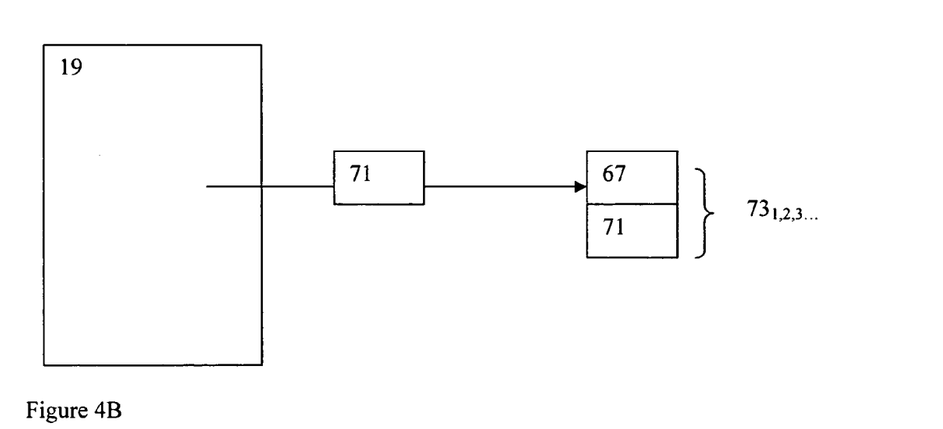
FIG. 4B illustrates the procedure for adding a unique identifier to the hashcode.

With reference to FIG. 4B, in certain embodiments discussed below, application 19 will also concatenate a unique identifier 71, which corresponds to user 51, to create information 73. Every recipient within population 13 will be assigned a different identifier. The information 73, including hashcode 67 and unique identifier 71, will then be compared to all the e-mails sent to the other e-mail recipients 15 running application 19.

Using either hashcode 67 alone in some embodiments, or information 73 in other embodiments, both of which uniquely identify the content of every new e-mail 65, application 19 can then proceed to count the number of identical e-mails sent to population 13. This can be accomplished in one of several ways.

Figure 5:
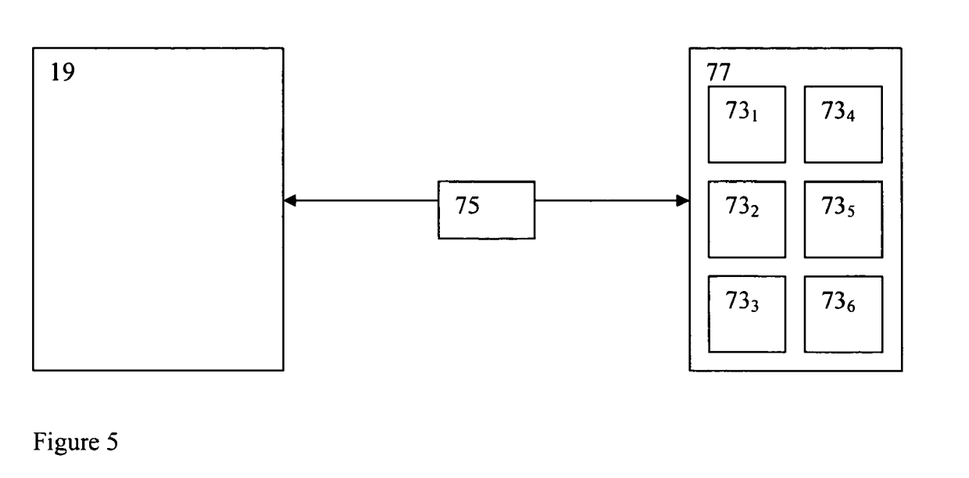
FIG. 5 illustrates one embodiment of the present invention which utilizes a database of collected hash codes.

With reference to FIG. 5, in one embodiment, application 19, having developed information 73, will establish a connection 75 with database 77. This connection may be inherent if database 77 and application 19 reside in the same location (such as could be the case if application 19 was remote to the computer of recipient 51), or may have to be independently established if database 77 is stored in a location remote to application 19 (such as would the case if application 19 were installed onto the computer of recipient 51.)

Database 77 is comprised of numerous hashcodes, generated by application 19 representing e-mails sent to all of the e-mail recipients 15 of population 13. Because the same one way algorithm will be used to create the hashcodes corresponding to all e-mail sent to recipients 15, all identical e-mails will have the same hashcode. Further in light of the fact that all hashcodes are communicated to database 77, database 77 is able to tally a running total of how many recipients 15 have received the same e-mail. In this process, if an email recipient 15 had received more than one identical e-mail, only one will be counted in the total. This is accomplished by application recognizing only one hashcode 67 per unique identifier 71 in order to avoid the effect of multiple identical e-mails sent to the same recipient 15 (i.e. in database 77 each information 73 will be unique to every other information 73, there will be no duplicates). Application 19, upon communicating information 73 relating to new e-mail 65 to database 77, will determine the number of instances that an e-mail identical to e-mail 65 had been sent to other e-mail recipients within population 13 simply by counting the number of instances of hashcodes 67. If the number of instances of e-mails identical to e-mail 65 attains a certain number or certain percentage, application 19 will identify that e-mail as mass unsolicited e-mail. Regardless of whether new e-mail 65 being is identified as mass unsolicited e-mail or not, database 77 will be updated to include new information 73 within database 77 so long as information 73 has not been previously added to database 77. This simple process of adding information to a database is a procedure well known in the art.

Figure 6:
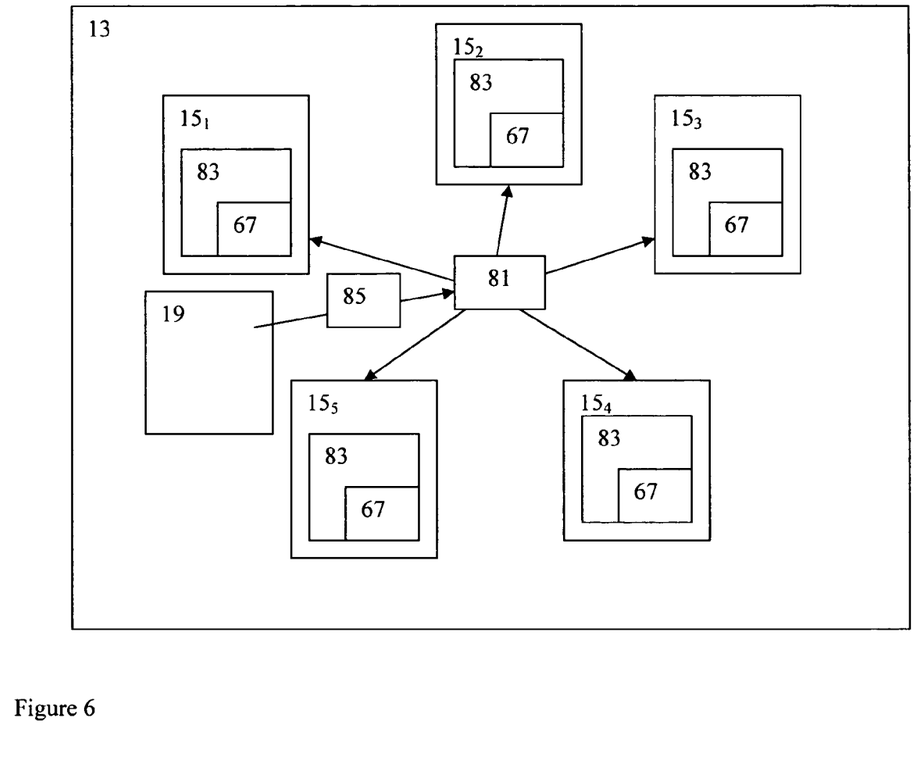
FIGS. 6 and 7 illustrate an alternate embodiment of the present invention which utilizes a peer to peer network.

In a second embodiment, as illustrated in FIG. 6, the application will subscribe each e-mail recipient 15 of population 13 to a peer to peer network 81. In this embodiment, hashcode 67 will not be compiled in a central database, but rather each recipient 15 will store every hashcode relating to all e-mail messages in folder 83 which will reside in the local host (not shown) being used to access network 81 (e.g. directory on a home computer hard drive or memory space within a PDA). Thus, upon developing hashcode 67 for new e-mail 65, application 19 will issue query 85 to network 81 thus searching folder 83 of every other recipient 15 within population 13 for identical hashcodes. In doing so, application 19 can count the number of instances of identical e-mails sent throughout population 13. Because each recipient 15 essentially stores every hashcode 67 locally, the need for unique identifiers 71 is obviated.

Figure 7:
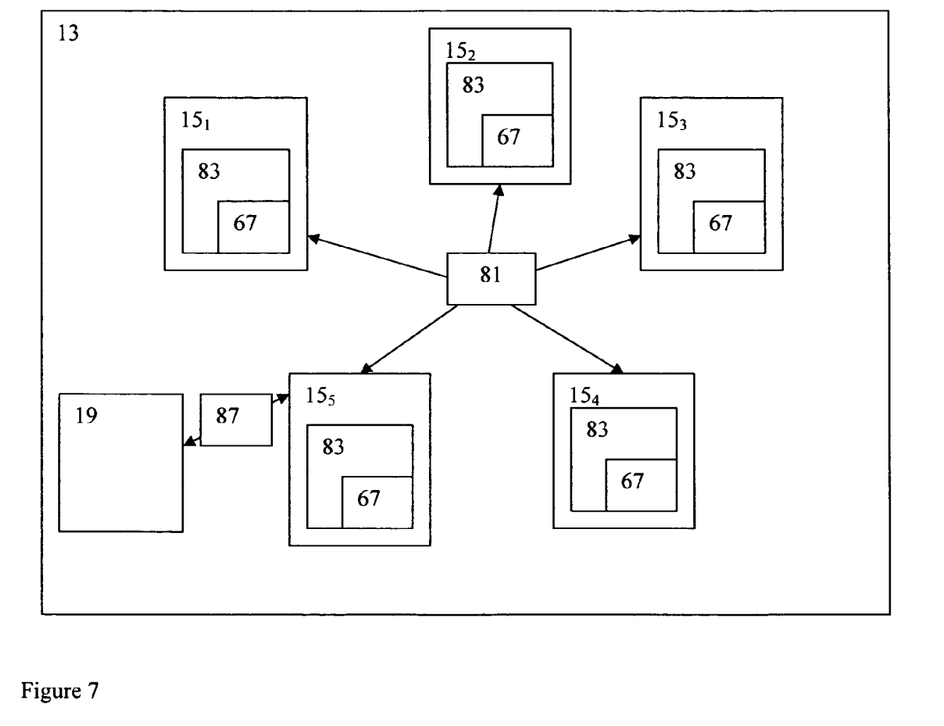

In order for this utility to be accomplished peer to peer network 81 must first be established as is illustrated in FIG. 7. This is accomplished by application 19 establishing a connection 87 with a recipient 15 in population 13 that is already in communication with other members of peer to peer network 81. Connection 87 can be accomplished either by application 19 knowing the identity of recipient 15 and establishing connection 87, or can be accomplished through what is known in the art as a "port scan." Application 19 can acquire this known location from a list of peers that are known to be online or from a list of known location(s) (IP address(es)) that in turn provides an already connected peer location. This list can be written into application 19 when it is downloaded, inserted by means of execution parameters, inserted by a configuration file etc. So every peer in the network can act as a connection point to the whole network and at startup an already connected peer's location must be available to connect. This development of peer to peer network 81 without a centralized server is well known in the art. Gnutella, for example is the name of a network using this type of technology.

In either embodiment, with reference to FIG. 7, if new email 65 is identified as mass unsolicited e-mail, application 19 will manage new e-mail 65 in any number of methods according to the preferences of recipient 51. For instance, recipient 51 may direct application 19 to delete all e-mails from mailbox 57 that are identified as mass unsolicited e-mail. Other embodiments may include that copying of mass unsolicited e-mail into a folder designated for such e-mails, or may truncate or bifurcate the e-mail such that only portions of mass unsolicited e-mail are communicated to recipient 51. The options available for the management of mass unsolicited e-mails will be dependant on the type of protocol used by mailbox 57 and may also depend, in part, on the preferences of recipient 51. However, any commonly known method of management of files can be easily applied to the management of mass unsolicited e-mails of the present invention, including those future methods.

What is claimed is:

1. A method for the identification of mass unsolicited e-mail, said system including the steps of:
   a. providing an application to access all e-mails sent to at least one e-mail address of a first user;
   b. providing said application to a population of other users
   c. allowing said application to access all e-mails sent to at least one e-mail address of each said other users;
   d. retrieving, from at least one e-mail server, for said first user, and from at least one e-mail server of each said other user, by said application, at least parts of all said e-mails sent to said e-mail addresses of said users;
   e. converting for said first user, by said application, said at least parts of said e-mails into a subject hash code uniquely identifying said e-mail;
   f. converting, by said application for said other users, said at least parts of said e-mails into a target hash code uniquely identifying said e-mails;
   g. comparing said subject hash code to all of said target hash codes uniquely identifying said e-mails;
   h. counting the instances of said subject hash code being identical to said target hashcodes; and
   i. labeling said e-mail as mass unsolicited e-mail if said instances of said identity attains a pre-defined number.

2. The method of claim 1 further including the step of providing a server for said application.

3. The method of claim 2 further including the step of compiling a list of said target hash codes on said application server.

4. The method of claim 1 wherein the step of comparing consists of comparing said subject hash codes with said list of said target hash codes.

5. The method of claim 1 further including the step of providing a peer to peer network whereby said application of said first user can communicate with said application of all said other users.

6. The method of claim 1 wherein the step of comparing further includes the step of querying said applications of said other users within said population for identical hash codes.

7. The method of claim 1 further including the step of altering the delivery protocols pertaining to said mass unsolicited e-mail.

8. The method of claim 7 wherein the step of altering includes the step of deleting said mass unsolicited e-mail from said e-mail server.

9. The method of claim 7 wherein the step of altering includes the step of moving said e-mail into a folder designated for mass unsolicited e-mails.

10. A system for the management of mass unsolicited e-mail including the steps of:
    a. compiling a population of e-mail recipients having at least one e-mail address;
    b. retrieving, from at least one e-mail server, at least parts of all e-mails sent to said e-mail addresses of all members of said population;
    c. converting, for each said e-mail, said at least parts of said e-mail into a hash code;
    d. counting the number of instances of identical hash codes;
    e. labeling said e-mail corresponding to said hash code as mass unsolicited e-mail if number of instances of identical hash codes attains a pre-defined number; and
    f. altering the delivery protocols pertaining to said mass unsolicited e-mail.

11. The system of claim 10 further including the step of providing an application server.

12. The system of claim 11 further including the step of compiling a list of said hash codes in said application server.

13. The system of claim 10 further including the step of establishing communication between every said application for each said member of said population.

14. The system of claim 13, wherein said step of counting further includes the step of querying every said application for each said member of said population for identical hash codes.

15. The system of claim 10 wherein the step of altering includes the step of deleting said mass unsolicited e-mail from said e-mail server.

16. The system of claim 10 wherein the step of altering includes the step of moving said e-mail into a folder designated for mass unsolicited e-mails.

* * * * *